United States Patent
Kim et al.

(10) Patent No.: US 9,344,554 B2
(45) Date of Patent: May 17, 2016

(54) METHOD FOR ACTIVATING USER FUNCTIONS BY TYPES OF INPUT SIGNALS AND PORTABLE TERMINAL ADAPTED TO THE METHOD

(75) Inventors: Jin Yong Kim, Seoul (KR); Dong Jun Shin, Seoul (KR); Hee Woon Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 542 days.

(21) Appl. No.: 12/764,233

(22) Filed: Apr. 21, 2010

(65) Prior Publication Data
US 2010/0283735 A1 Nov. 11, 2010

(30) Foreign Application Priority Data
May 7, 2009 (KR) ........................ 10-2009-0039855

(51) Int. Cl.
*H04M 1/725* (2006.01)
*G06F 3/0488* (2013.01)
*G06F 3/16* (2006.01)

(52) U.S. Cl.
CPC ......... *H04M 1/72583* (2013.01); *G06F 3/0488* (2013.01); *G06F 3/167* (2013.01); *H04M 1/72547* (2013.01); *H04M 1/72558* (2013.01); *H04M 2250/22* (2013.01); *H04M 2250/74* (2013.01)

(58) Field of Classification Search
CPC .. G06F 3/0482; G06F 3/167; H04M 1/72558; H04M 2250/22; H04M 2250/74
USPC .................................................. 345/173, 619
See application file for complete search history.

(56) References Cited

U.S. PATENT DOCUMENTS

| | | | | |
|---|---|---|---|---|
| 6,968,311 | B2 * | 11/2005 | Knockeart et al. | 704/270 |
| 7,392,194 | B2 * | 6/2008 | Tanaka | 704/275 |
| 2002/0169610 | A1 * | 11/2002 | Luegger | 704/260 |
| 2003/0009330 | A1 * | 1/2003 | Cho | 704/235 |
| 2003/0014261 | A1 * | 1/2003 | Kageyama | 704/275 |
| 2008/0059888 | A1 | 3/2008 | Dunko | |
| 2008/0092171 | A1 * | 4/2008 | Roberts et al. | 725/46 |
| 2008/0158189 | A1 | 7/2008 | Kim | |
| 2008/0234177 | A1 | 9/2008 | Bremer et al. | |
| 2009/0254351 | A1 * | 10/2009 | Shin et al. | 704/275 |
| 2010/0088061 | A1 * | 4/2010 | Horodezky et al. | 702/141 |
| 2010/0218141 | A1 * | 8/2010 | Xu et al. | 715/834 |

FOREIGN PATENT DOCUMENTS

| | | | | |
|---|---|---|---|---|
| KR | 2000-049864 | 8/2000 | | H04B 1/38 |
| KR | 10-2008-0051573 A | 6/2008 | | |

* cited by examiner

*Primary Examiner* — Sahlu Okebato
(74) *Attorney, Agent, or Firm* — Cha & Reiter, LLC.

(57) ABSTRACT

A method for activating user functions by types of input signals and a portable terminal adapted to the method are disclosed. The input means of the portable terminal generate various types of input signals. The portable terminal activates and controls particular user functions according to corresponding input signals. In a multi-tasking situation where a plurality of user functions are simultaneously used, the portable terminal can activate and control the user functions according to the particular types of input signals.

20 Claims, 5 Drawing Sheets

METHOD FOR ACTIVATING USER FUNCTIONS BY TYPES OF INPUT SIGNALS AND PORTABLE TERMINAL ADAPTED TO THE METHOD

CLAIM OF PRIORITY

This application claims, pursuant to 35 USC 119(a), priority to, and the benefit of the earlier filing date of, that patent application entitled "METHOD FOR ACTIVATING USER FUNCTIONS BY TYPES OF INPUT SIGNALS AND PORTABLE TERMINAL ADAPTED TO THE METHOD," filed in the Korean Patent Office on May 7, 2009 and afforded serial number 10-2009-0039855, the contents of which are incorporated by reference herein.

BACKGROUND OF THE INVENTION

1. Field of the Invention

The present invention relates to communication systems, and more particularly, to a method that independently operates a plurality of user functions according to various types of input signals.

2. Description of the Related Art

Portable terminals refer to devices that can support a call function. They are widely applied to various areas as they are convenient to use and portable. These portable terminals have been equipped with various input systems to provide user functions. An example of the input systems that are used in portable terminals is a touch screen including a touch panel and a display unit. If the portable terminals are equipped with a touch screen, they process operations, related to a user's touches on a particular image displayed on the display unit, via the touch panel, generate a corresponding event, and control an application program corresponding to a user function based on the event.

Conventional portable terminals, however, need very complicated input motions on their touch screen to operate a plurality of user functions. For example, while a portable terminal user is executing one of the message checking function and the image searching functions, the user needs to generate a plurality of input signals to perform other tasks. That is, the user must generate various types of touch events to output a menu screen of menu items on a display unit to select one of the menu items or to search a message or image from the selected menu item. In addition, since the contents, information, menus, etc., are frequently changed on the display unit of the portable terminals, the user may easily lose the connection between the current task and other tasks not displayed on the display unit.

SUMMARY OF THE INVENTION

The present invention provides a method that allows a user to easily use the plurality of user functions according to various types of input signals, and maintains the connection with tasks added while the user is operating a plurality of tasks.

The present invention further provides a portable terminal adapted to the method for activating user functions according to types of input signals.

In accordance with an exemplary embodiment of the present invention, the present invention provides a method for activating user functions by types of input signals, including: generating at least one or more types of input signals in different types of input means; and activating and controlling a corresponding user function by the types of generated input signals in a multi-tasking situation where a plurality of user functions are simultaneously used.

In accordance with another exemplary embodiment of the present invention, the present invention provides a portable terminal that supports the activation of user functions by types of input signals, including: an input signal generating module including at least one type of input means that generates an input signal; a storage unit for storing application programs that support at least one user function; and a controller for activating, if a particular type of input signal is generated in at least one particular type of input means included in the input signal generating module, at least one user function, set according to the particular type of input signal, or controlling a activated user function. The controller controls activation, and processing, of a corresponding user function by the types of generated input signals in a multi-tasking situation when a plurality of user functions is simultaneously used.

BRIEF DESCRIPTION OF THE DRAWINGS

The features and advantages of the present invention will become more apparent from the following detailed description in conjunction with the accompanying drawings, in which.

DETAILED DESCRIPTION OF THE INVENTION

Figure 1:
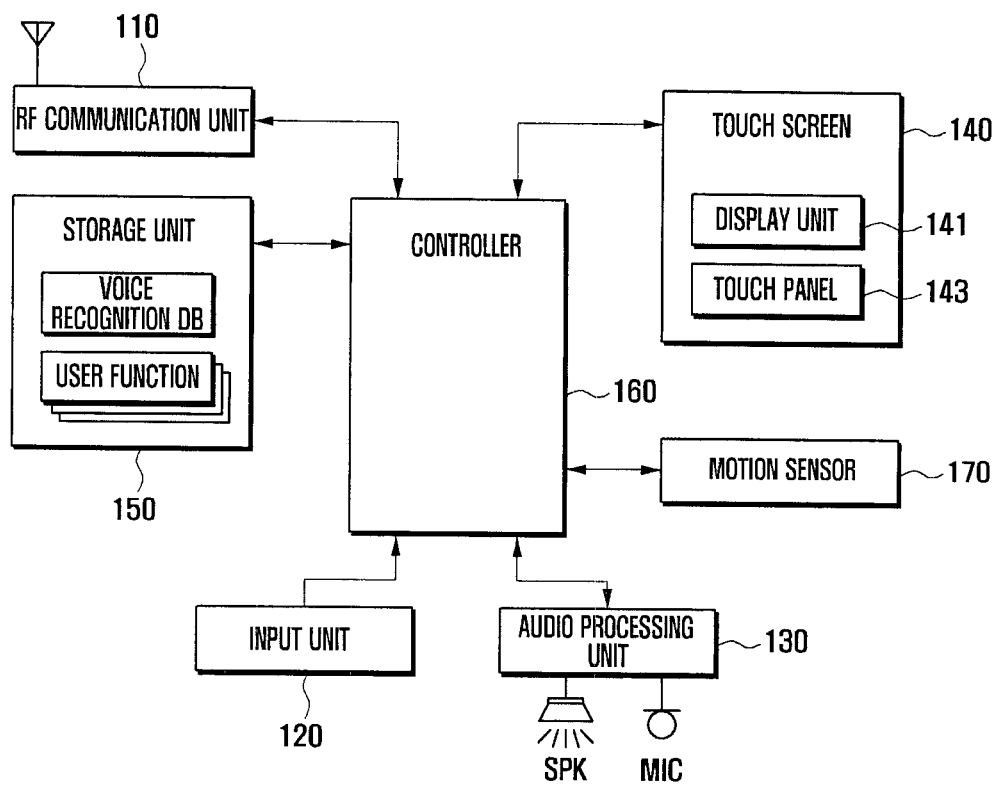
FIG. 1 is a schematic block diagram illustrating a portable terminal according to an embodiment of the present invention.

Exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

The terms or words described in the present description and the claims should not be limited by a general or lexical meaning, but instead should be analyzed as a meaning and a concept through which the inventor defines and describes the present invention using his best effort, to comply with presenting the ideas and implementation of the present invention. Therefore, one skilled in the art will understand that the embodiments disclosed in the description and configurations illustrated in the drawings are only preferred embodiments, and that there may be various modifications, alterations, and equivalents thereof to replace the embodiments at the time of filing this application.

FIG. 1 is a schematic block diagram illustrating a portable terminal according to an embodiment of the present invention.

Referring to FIG. 1, the portable terminal 100 includes an RF communication unit 110, an input unit 120, an audio processing unit 130, a touch screen 140, a storage unit 150, a motion sensor 170, and a controller 160. In an embodiment of the present invention, an input device may include the input unit 120, the touch screen 140, the motion sensor 170, and/or a voice recognizing module composed of a microphone MIC and a voice recognition processor. The input device refers to an input signal generating module for generating a particular type of input signal in a portable terminal. In the following description, elements of the input signal generating module will be explained in detail.

The portable terminal 100, configured as describe above, can control different user functions by types of input signals that are generated by a particular input device. That is, the portable terminal 100 can independently operate at least a number of different user functions according to particular types of input signals. Examples of the user functions are a first user function according to a touch event transmitted from the touch screen 140, a second user function that is performed based on data acquired by performing voice recognition via a microphone MIC of the audio processing unit 130, and a third user function that is performed based on the operation of the motion sensor 170. In addition, the portable terminal 100 applies combined input signals, transmitted from the touch screen 140, the voice recognizing module, and the motion sensor 170, to a particular user function. That is, the portable terminal 100 can support a particular user function as groups. For example, a group of user functions may include a touch event and voice recognition data, or a voice recognition data and a motion sensor's signal, or a touch event and a motion sensor's signal or other combinations of touch events, motion sensor signals and voice recognition data. In the following description information, each element of the portable terminal 100 is explained in detail.

The RF communication unit 110 establishes communication channels for performing a voice call and for transmitting data, such as images, etc., under the control of the controller 160. That is, the RF communication unit 110 establishes a voice call channel, a data communication channel, and/or a video call channel among mobile communication systems. To this end, the RF communication unit 110 includes an RF transmitter for up-converting the frequency of signals to be transmitted and amplifying the up-converted signals and an RF receiver for low-noise amplifying received RF signals and down-converting the frequency of the received RF signals. The RF communication unit 110 can be activated according to at least one of the touch events that occurred in the touch panel 143, a key input signal generated by the input unit 120, voice recognition data of the audio processing unit 130, or a motion signal from the motion sensor 170. While the portable terminal 100 is performing a variety of user functions, such as file searching, file playing back, broadcast receiving, image capturing, etc., if the RF communication unit 110 receives one of the input signals described above, it can be activated as a multi-tasking mode, activating the currently activated user function. For example, if the RF communication unit 110 receives one of the input signals in a state while a file searching function is being activated, it can activate a user function according to the input signal, for example, a video call function. That is, the user function is operated based on the RF communication unit 110.

The input unit 120 is composed of a plurality of input keys and function keys to receive numerical or alphabetical information and to set a variety of functions. The function keys include direction keys, side keys, shortcut keys, etc., which are set to perform specific functions. The input unit 120 generates key input signals related to a user's settings and the function control of the portable terminal 100 and transmits them to the controller 160. The input unit 120 may be implemented with a QWERTY keypad, 3×4 keypad, 4×3 keypad, etc. The input unit 120 may be omitted if the portable terminal 100 is equipped with the touch screen 140 as a full screen.

The audio processing unit 130 includes a speaker SPK for reproducing audio data transmitted during the voice call and a microphone MIC for receiving a user's voice during the voice call or other audio signals. The controller 160 can recognize voice signals received from the microphone MIC if a voice recognition function is set. The speaker SPK can output particular voice information, stored in the storage unit 150, through audio signals, under the control of the controller 160. For example, if a text message is stored in the storage unit 150, the audio processing unit 130 converts the voice information corresponding to the text message into audio signals and then outputs the converted text message.

The touch screen 140 includes a display unit 141 and a touch panel 143. The touch screen 140 may be configured in such a way that the touch panel 143 is mounted on in front of the display unit 141. The size of the touch panel 143 is determined by the size of the touch screen 140.

The display unit 141 displays a variety of menus of the portable terminal 100 and information input or provided by or to a user. That is, the display unit 141 can provide a variety of screens, for example an idle screen, a menu screen, a message writing screen, a call screen, etc. If a plurality of user functions is activated in the portable terminal 100, the display unit 141 can display screens corresponding to the user functions. The display unit 141 can display a screen corresponding to one user function on one screen, as a foreground (image), and another screen corresponding to the activation of another user function, as a background. The display unit 141 can also display divided screens, according to the activation of a plurality of user functions, on respective areas of the screen. In that case, each of the screens corresponding to the user functions are reduced in terms of size compared with the entire screen. The form of the screen corresponding to the user function differs when it is displayed alone on the display unit and together with another user function. For example, while a first screen corresponding to a first user function is being displayed on the entire screen, if a second user function is activated, the size of the first screen is reduced to a certain size on the display unit 141. That is, a new area is generated due to the reduction of the size of the first screen. In that case, on the new area, a screen is displayed, showing information notifying the user that the second user function has been activated. When the user selects a screen corresponding to the second user function and generates an input signal to change the screen to the entire screen, for example, a touch event, etc., the portable terminal 100 moves the first screen to the background and simultaneously displays the second screen corresponding to the second user function on the entire screen. In addition, the portable terminal 100 can switch the places between the first screen and the second screen, and simultaneously display an information showing screen corresponding to the first screen on an area on which an information showing screen corresponding to the second user function was displayed. The information showing screen displays information notifying the user of the type of user function currently activated or the type of function performed by a user function. For example, the information showing screen displays information related to user functions, such as 'music player,' 'music title,' 'message receive notification,' etc. The display unit 141 may be implemented with a liquid crystal display (LCD), an organic light emitted diode (OLED), etc.

The display unit 141 is smaller than the touch panel and arranged under the touch panel 143.

The touch panel 143 is configured to cover the display unit 141. When an object contacts or approaches the touch panel 143, the touch panel 143 generates a touch event and transmits it to the controller 160. The touch panel 143 further includes sensors arrayed in the matrix form. The touch panel 143 acquires information regarding a position where a touch event has occurred and information regarding the type of the touch event and transmits it to the controller 160. The controller 160 detects the position and type of touch event from the received information and identifies a particular image mapped to the corresponding position of a display unit. The controller 160, in response to the touch event, activates a user function linked to the image.

The motion sensor 170 can be implemented with various types of sensors. In an embodiment of the present invention, the motion sensor 170 may be implemented with an acceleration sensor, a gyro-sensor, a pressure sensor, and/or a vibration sensor, etc. These sensors are operated by the supply of electric power controlled by the controller 160. The sensor(s) generates a particular signal according to the motion of the portable terminal 100, the pressure applied to the portable terminal 100, or the like.

The storage unit 150 stores application programs required to operate functions according to an embodiment of the present invention. If the portable terminal 100 is equipped with a touch screen, the storage unit stores a key map or a menu map, etc., for operating the touch screen. The key map and the menu map can be implemented in various forms. For example, the key map may be a keyboard map, a 3×4 key map, a QWERTY key map, etc. In particular, the key map may be a control key map for controlling an application program being currently activated. The menu map may be implemented with a menu map for controlling an application program currently being activated or a menu map composed of various menu items. The storage unit 150 is configured to include a program storing area and a data storing area.

The program storing area stores an operation system for booting the portable terminal 100 and operating the elements included in the portable terminal 100. The program storing area also stores various application programs, examples of which may include one or more of the following: an application program for playing back various types of files, an application program for supporting a call function corresponding to each user function according to whether the portable terminal supports the functions, a web browser for accessing the Internet, an MP3 application program for reproducing audio sources, an image output application program for displaying images, pictures, etc., an application program for reproducing a moving image, etc. In an embodiment of the present invention, the program storing area further stores a touch operating program for supporting a touch function, a voice operating program for recognizing voices, an operating program for controlling a motion sensor, etc. The program storing area also stores a user function-related operating program for independently controlling the application programs described above, according to input signals. The program storing area may include at least one of the user functions that are activated or controlled by input signals generated from one type of input means or from at least two or more types of input means.

The data storing area stores data generated when the portable terminal 100 is operated. The data storing area also stores phone book information, at least one icon according to the widget function, and various contents. If the portable terminal 100 is equipped with a touch screen 140, the data storing area stores user's input from the touch screen. In an embodiment of the present invention, the data storing area includes a voice recognition data base for recognizing voice-recognized words.

Figure 2:
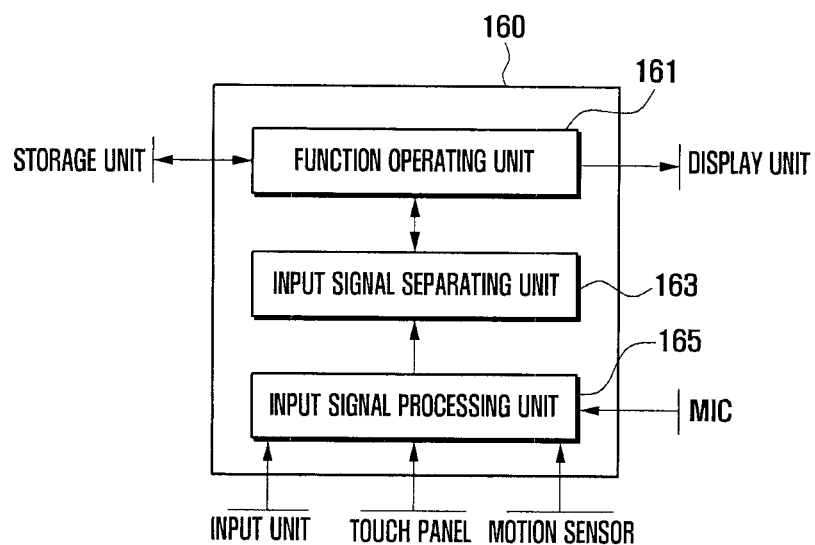
FIG. 2 is a detailed view illustrating the controller 160 shown in FIG. 1.

The controller 160 supplies electric power to the elements of the portable terminal 100 so that they can perform an initializing process. After that, the controller 160 controls signal flows among the elements to operate a touch function and a voice recognition function, together. To this end, as shown in FIG. 2, the controller 160 includes a function operating unit 161, an input signal separating unit 163, and an input signal processing unit 165.

The input signal processing unit 165 includes a key input signal processor for processing key input signals from the input unit 120, a touch event processor for processing touch events from the touch panel 143, a operation signal processor for generating operation signals based on sensor signals transmitted from the motion sensor 170, and a voice processor for recognizing/processing voices from the microphone MIC. The processors included in the input signal processing unit 165 may be operated according to the control of the controller 160. That is, when the portable terminal user selects at least one of the processors, the selected processor(s) is activated according to user functions. For example, if the user selects a search menu for searching a file, the touch event processor of the input signal processing unit 165 is activated. In addition, if a message receiving function is activated, the voice processor or the motion signal processor is activated. If the display unit 141 is turned on, the input signal processing unit 165 activates the processors so that they can process input signals. When the display unit 141 is turned off, the input signal processing unit 165 deactivates at least one of the processors.

If the portable terminal 100 is equipped with an input unit, a corresponding key input signal processor (not shown) determines a type of key input signal output from the input unit. That is, the key input signal processor may identify whether the key input signal corresponds to a volume control key signal, a numerical key signal, an alphabetical key signal, and may output information regarding the identified key input signal to the input signal separating unit 163.

A touch event processor (not shown) identifies information regarding a position or location where a touch event has occurred and information regarding the type of touch event. If a particular function has been previously set on the position where the touch event has occurred, the touch event processor identifies the type of the set function and then outputs information regarding the identified type of set function to the input signal separating unit 163.

An operation signal processor (not shown) determines which type of operations the portable terminal 100 is performing based on the sensor signals of the motion sensor 170. For example, the operation signal processor identifies whether an input signal corresponds to a tapping motion, a shaking motion, a snapping motion, a tilting motion, a gripping motion, no motion, etc., based on the sensor signal output from the motion sensor 170, and then outputs the identified input signal to the input signal separating unit 163. More particularly, when the user taps the case of the portable terminal, the operation signal processor receives a sensor signal via at least one of the vibration sensor and the pressure sensor included in the motion sensor 170, and generates an input signal corresponding to the sensor signal. Likewise, if the user shakes the portable terminal 100, the operation signal processor receives a sensor signal via at least one of the acceleration sensor and the vibration sensor, included in the motion sensor 170, and generates an input signal corresponding to a shaking or snapping motion, i.e., a shaking input signal and a snapping input signal, based on the received sensor signal. The operation signal processor can distinguish different vibration waveforms that are generated when the portable terminal 100 is shaken or snapped, and generate a shaking input signal or a snapping input signal based on the distinguished vibration waveforms. In addition, the operation signal processor can generate a tilt input signal according to a sensor signal from a gyro sensor. The operation signal processor can also generate a gripping input signal according to a sensor signal from a pressure sensor. Furthermore, the operation signal processor can generate an input signal corresponding to a rubbing motion based on the sensor signal.

The voice processor recognizes voices collected by the microphone MIC based on the voice recognition database stored in the storage unit 150. The voice processor outputs the recognized voice data to the input signal separating unit 163. The voice processor outputs voice information stored in the storage unit 150 via the speaker SPK of the audio processing unit 130, according to the control of the function operating unit 161. The voice processor can be implemented with various voice recognizing algorithms. For example, the voice process, adapted to a voice recognition algorithm, samples a voice signal received by the microphone MIC with 16 kHz, quantizes the sampled signal at 16 bits, and stores the quantized signal. The quantized voice data can be analyzed in such a way that it is processed by a transfer function of a certain value, and shifted by 10 ms, by multiplying a Hamming window of 25 ms. Through this analysis, the voice characteristic parameter of the total $39^{th}$ orders containing the difference components of $1^{st}$ and $2^{nd}$ can be applied to algebraic energy analysis that is normalized to $12^{th}$ LPC-MEL spectrum coefficients. The voice recognition model to which the characteristic parameter is applied generates a phonetic decision tree at each state position, and is adapted to a method that learns state streams of a context-dependent audio model by successive state splitting (SSS), using learning voice data. Since the method can quickly perform the state splitting, it can select and split states to be split by the SSS, simultaneously perform a state splitting with respect to the total splitable state, and can select a state with the highest likelihood. In addition, a hidden Markov network may be applied to the audio model in the voice processor. The voice processor may be implemented with a method that analyzes the frequency of voice waves based on a variety of algorithms and extracts and separates the feature of a range of voice or the equivalent of the range, which distinguishes vowels. It should be understood that the voice processor is implemented with not only the voice recognizing algorithms described above but also with other various algorithms.

The input signal separating unit 163 classifies input signals, output from the input signal processing unit 165, by user functions being currently activated, and then outputs the classified input signals to the function operating unit 161.

The function operating unit 161 includes an activated application program corresponding to at least one user function. The function operating unit 161 applies the classified input signal from the input signal separating unit 163 to a particular user function. After that, according to the input signal applied to the user function, the function operating unit 161 changes a screen interface on the display unit 141, outputs voice information via the speaker SPK, or controls the vibrating member of the portable terminal 100. The following description provides the operation of changing the screen interface and controlling the elements according to the control of the function operating unit 161, with reference to FIGS. 3 to 5.

Figure 3:
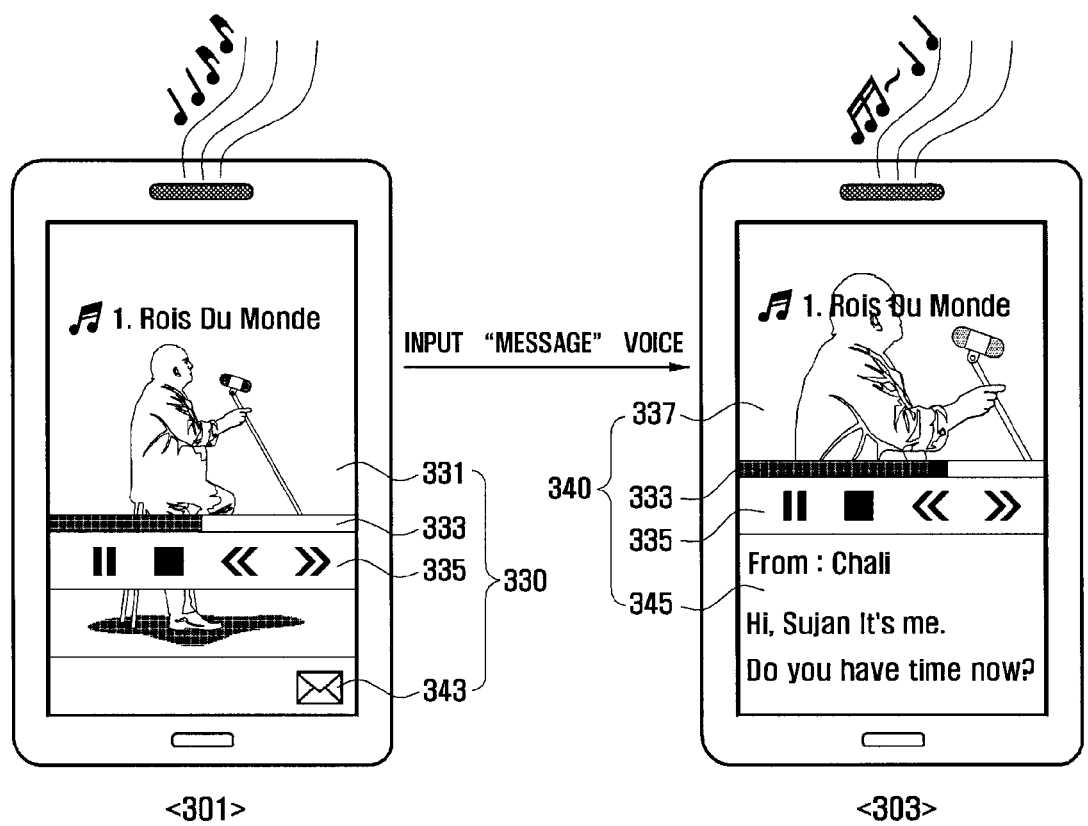
FIG. 3 shows screens that describe a process of activating a user function, according to a first embodiment of the present invention.

FIG. 3 shows screen views 301, 303 that describe a process of activating a user function, according to a first embodiment of the present invention.

As shown in view 301 of FIG. 3, when a portable terminal user activates a file playback function, the portable terminal 100 displays a file playback screen 330 for playing back a user's selected file on the display unit. The file playback screen 330 is composed of an information displaying area 331 for displaying a name of a user's selected file, an image related to the file, etc., a control key area 335 for displaying a control signal to play back a file according to a touch event, and a proceeding bar area 333 for indicating the file playback lapse. If the portable terminal 100 receives a message from a mobile communication system during the file playback, it can display a message reception icon 343 notifying the user that a message has been received on one side of the file playback screen 330.

The portable terminal user needs to check the received message while the user is listening to audio as a file or a video file is played back. The user may then generate a preset voice signal, for example, a voice signal corresponding to "Message," at the area where the microphone MIC of the portable terminal is arranged. When the voice "Message" is input to the microphone MIC, the portable terminal 100 recognizes it as a voice command based on the voice recognizing DB and the voice recognizing algorithm and generates corresponding voice recognition data. If the portable terminal has received a message, it can control the microphone activation for recognizing a voice. Also, the portable terminal can set a group of voice signal candidates to check message reception. That is, the portable terminal 100 compares a voice signal transmitted from the outside with a voice signal corresponding to "Message," and ascertains, if the comparison value is equal to or greater than a preset reference, that the received voice signal corresponds to a voice signal to check the received message.

If the portable terminal 100 detects a voice signal to check the received message, it can activate a message function. In that case, as shown in view 303 of FIG. 3, the portable terminal 100 displays a message screen 345 for showing a received message and a reduced file playback screen 340. That is, the file playback screen 330 is reduced or may be partially or fully removed in order to display the received message. In the illustrated example, the reduced file playback screen 340 is composed of an information displaying area 337, a part of which is reduced or removed, compared with the information displaying area 331 shown in view 301, a control key area 335 for playing back a file, and a proceeding bar area 333. The reduced file playback screen 340 is arranged in the middle portion and the upper portion of the display unit. On the other hand, the message screen 345 is arranged at the lower portion of the display unit 141, i.e., below the reduced file playback screen 340. The portable terminal 100 can activate a part of a touch panel corresponding to the reduced file playback screen 340, so that a file playback can be performed according to a touch event that occurred on the part of touch panel. In addition, the portable terminal 100 can deactivate a part of touch panel corresponding to the message screen 345 not to generate a touch event thereon or activate the part of touch panel corresponding to the message screen 345 to process a touch event to check a received message. That is, if visual information, for example, text information, is so large that it cannot be displayed in its entirety on message screen 345 of the display unit, it can be displayed by a slide function (not shown) of the portable terminal 100. That is, when the user performs a touch drag motion on the message screen 345 in a certain direction, such as in the vertical direction, the screen showing the text information can be scrolled.

The reduced file playback screen 340 shown in view 303 may be generated as in the file playback screen 330 shown in view 301 in a reduced manner (i.e., altering the resolution of the image) or by removing a portion of the file playback screen 330. Although the embodiment is implemented in such a way that the reduced file playback screen 340 includes the information displaying area 337, a part of which is reduced or removed representation of area 331, view 301, the control key area 335, and the proceeding bar area 333, it should be understood that the present invention is not limited to the embodiment illustrated. For example, in order to display a relatively large amount of visual information contained in a message on the display unit, the embodiment of the present invention can be modified in such a way to remove at least one area from the three areas in the reduced file playback screen 340, thereby securing an additional space in the message screen 345. That is, the reduced file playback screen 340 includes only the control key area 335 or the information displaying area 337. In addition, the reduced file playback screen 340 may be implemented with a screen composed of a new image or text notifying the user that the current file is played back, irrespective of the three areas. While the portable terminal is displaying the message screen 345, it can output audio or video signals according to a file playback.

As described above, while the portable terminal is playing back a file based on a touch event function, it can support a message reception checking function via commands transmitted according to a voice recognition function.

Figure 4:
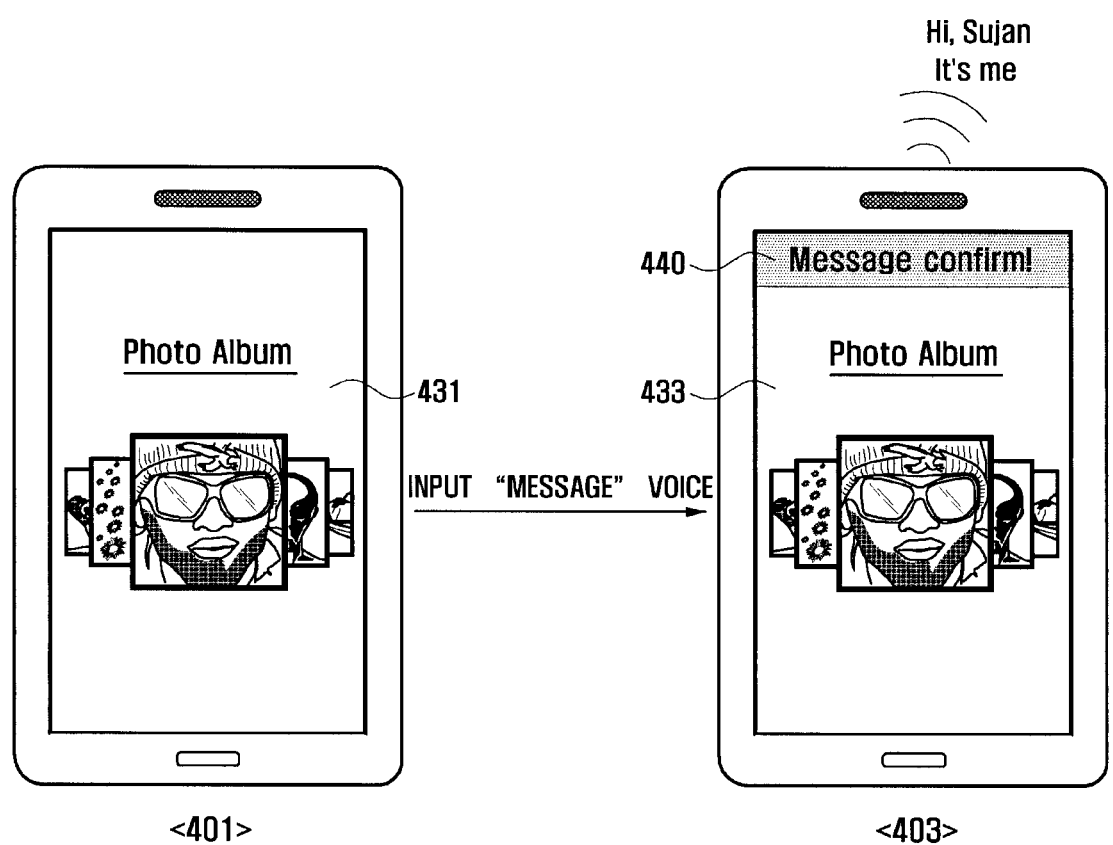
FIG. 4 shows screens that describe a process of activating a user function, according to a second embodiment of the present invention.

FIG. 4 shows screen views 401, 403 that describe a process of activating a user function, according to a second embodiment of the present invention.

As shown in view 401 of FIG. 4, when a user activates a photograph file search function, the portable terminal displays a first file search screen 431 for searching a user's selected photograph file on the display unit. More specifically, when a user selects a menu for searching a photograph file via a touch event or the input unit, the portable terminal displays a first file search screen 431 for searching a photograph file. The first file search screen 431 can support a file search function according to a user's touch event. That is, if the user touches the touch panel in the left or right direction thereby generating a touch drag event or a flick event, the portable terminal replaces a currently photograph with another photograph on the display unit, according to the touch event.

If the portable terminal receives an input signal, for example, a preset voice signal, via the microphone MIC while it is displaying the first file search screen 431, the portable terminal activates a user function corresponding to the received voice signal, so that a screen corresponding to the user function can be displayed on one side of the display unit or information corresponding to the user function can be output. More specifically, the user needs to check whether a message is received while searching for a photograph file through the first file search screen 431. If the portable terminal receives a message from a mobile communication system, the portable terminal can display a message icon notifying the user of message reception on one side of the display unit for a known period of time or before the user's checking input signal is generated. In addition, if the portable terminal receives a message, it can notify the user of the reception of a message by outputting a preset alert, for example, a particular vibration pattern, instead of displaying a particular icon.

On the other hand, the portable terminal user can generate a preset voice signal, for example, a voice signal corresponding to "Message," when a microphone MIC is installed. In that case, the portable terminal collects a voice signal corresponding to the term "Message" and performs voice recognition with respect to the voice signal, based on the voice recognition algorithm and the voice recognition DB. If the portable terminal ascertains that the voice signal based on the voice recognition data corresponds to a command for activating a message reception checking function, it displays an image corresponding to a message function screen 440 notifying the user that a message reception function is activated, on one side of the display unit, and a second file search screen 433 on the remaining area of display unit, as shown in view 403 of FIG. 4. The portable terminal can output information, contained in the received message, via a voice signal. The message function screen 440 can display only brief information notifying the user that a message function is being executed in a particular area in the display unit, for example, an upper portion. In another aspect, the message function screen 440 can be displayed as an icon on one side of the display unit, according to a user's setting. When the user inputs a voice signal, "Message," in the portable terminal, the portable terminal outputs information contained in the latest received message, via a voice signal. To this end, the portable terminal may employ a text to signal (TTS) function to convert visual information, contained in the message, to voice signals. If the message includes various icons, symbols, images, etc., and there is a voice DB corresponding to a corresponding icon, symbol, or image, the portable terminal can output a voice signal based on the voice DB. For example, if a baseball icon '  ' is contained in the message and a "voice signal" corresponding to the baseball is stored in the voice DB, the portable terminal can output the voice signal corresponding to the "baseball icon."

Meanwhile, the portable terminal may change and display the second file search screen 433, in terms of size and form, corresponding to the size of the message function screen 440. That is, if the message function screen 440 occupies a certain area of the upper portion on the display unit as shown in view 403, the display unit displays the second file search screen 433, which was generated as the first file search screen 431 as shown in view 401, reduced in size or a part of the first file search screen 431 is reduced.

As described above, if the portable terminal receives a preset input signal in a state while a first user function is being activated, it can activate a second user function corresponding to the input signal. During this process, the portable terminal can output a voice signal corresponding to the user function according to a preset input signal. In addition, the portable terminal can identify types of user functions and apply a function, not conflicted with the first user function, to a second user function. That is, if a file search function is activated, the portable terminal does not output an audio signal via the speaker SPK. Therefore, if a message reception function is activated as a second user function, the portable terminal automatically converts information contained in the received message into a voice signal and outputs it via the speaker SPK. This setting can be changed by the portable terminal user. For example, if a message reception function is activated as a second user function, the portable terminal may output a message reception screen on one side of the display unit as shown in view 303 of FIG. 3.

Figure 5:
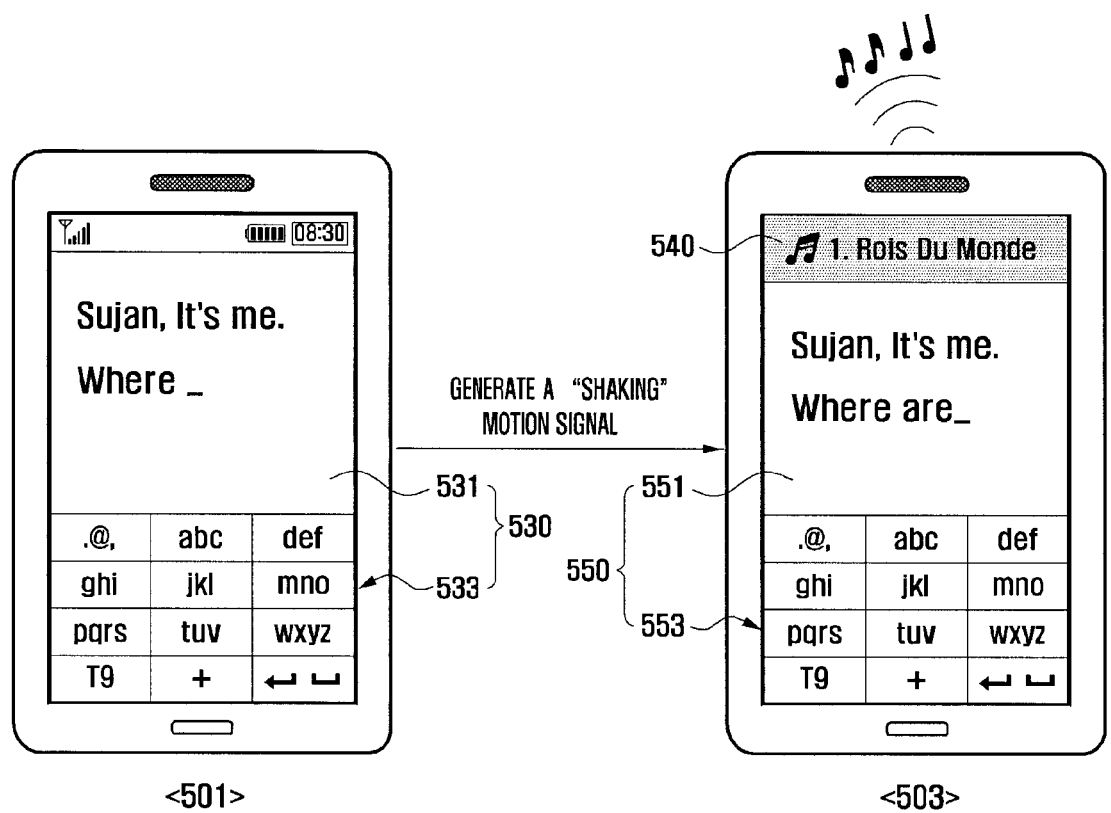
FIG. 5 shows screens that describe a process of activating a user function, according to a third embodiment of the present invention.

FIG. 5 shows screen views 501, 505 that describe a process of activating a user function, according to a third embodiment of the present invention.

As shown in view 501 of FIG. 5, when a user activates a message writing function, the portable terminal displays a screen allowing a user to write a message. That is, the portable terminal displays a first message writing screen 530 on the display unit. The first message writing screen 530 is comprised of a first key map area 533 for inputting numerals and letters for a message, and a first text area 531 for outputting numerals and letters according to touch events occurred in the first key map area 533. In order to operate the first message writing screen 530, the user can select a menu for writing a message using an input unit or a touch screen. The portable terminal compares information regarding a position where a touch event occurs in the first key map area 533 with the key map, and displays a number or letter corresponding to an area where the touch event has occurred on the first text area 531.

The portable terminal user may want to listen to music while the user is writing a message. In that case, the user can generate a preset motion signal. For example, the portable terminal may be set to generate a motion signal corresponding to a shaking motion if it is shaken over a preset number of times in a certain direction.

As shown in view 503 of FIG. 5, the portable terminal can perform a file playback function according to a preset motion signal. During this process, the portable terminal can display a file playback function screen 540 on one side of the display unit, where the file playback function screen 540 shows a state where a file playback function is currently performed and brief information regarding the type of played back file. If the file playback function screen 540 cannot display the brief information once, the portable terminal can be set to display a part of the entire information, for a certain period of time, and then a next part, on the file playback function screen 540 or to display the information on the file playback function screen 540 in a sliding (or scrolling) way. In addition, the file playback function screen 540 can be displayed, as an icon, on a certain area of the display unit. For example, the file playback function screen 540 may be also output on one side of the display unit, corresponding to the size of the message icon 343 shown in view 301 of FIG. 3.

On the other hand, the portable terminal can also display a second message writing screen 550 that is smaller than the first message writing screen 530, where the second message writing screen 550 is comprised of a second text area 551 and a second key map area 553. That is, if the file playback function screen 540 occupies a certain area of the display unit 141 and is displayed thereon, the second message writing screen 550 is displayed on an area other than the area occupied by the file playback function screen 540. If the file playback function screen 540 is arranged, as an icon, on one side of the display unit, the second message writing screen 550 can be displayed as the same size as the first message writing screen 530.

When a motion signal, such as a shaking motion, a titling motion, a snapping motion, etc., additionally occurs while the portable terminal is performing a file playback function, the portable terminal can control the file playback function according to the additional motion signal. That is, when a currently output file has a sequence, the portable terminal plays back the previous file if the portable terminal is tilted to the left, and the next file if the portable terminal is tilted to the right. If a shaking signal is generated, the portable terminal increases or decreases the volume according to the number of shaking signals.

As described above, the method for activating user functions by types of input signals, according to the present invention, can operate a first user function based on a first type of input signal and substantially simultaneously a second user function based on a second type of input signal. That is, the portable terminal according to the present invention provides various types of input signals, generated by elements included therein and differ from each other, and operate independently, a variety of user functions based on the various types of input signals. Therefore, the portable terminal does not need to perform a screen switch. The portable terminal can also rapidly perform user function activation without selecting a menu.

Figure 6:
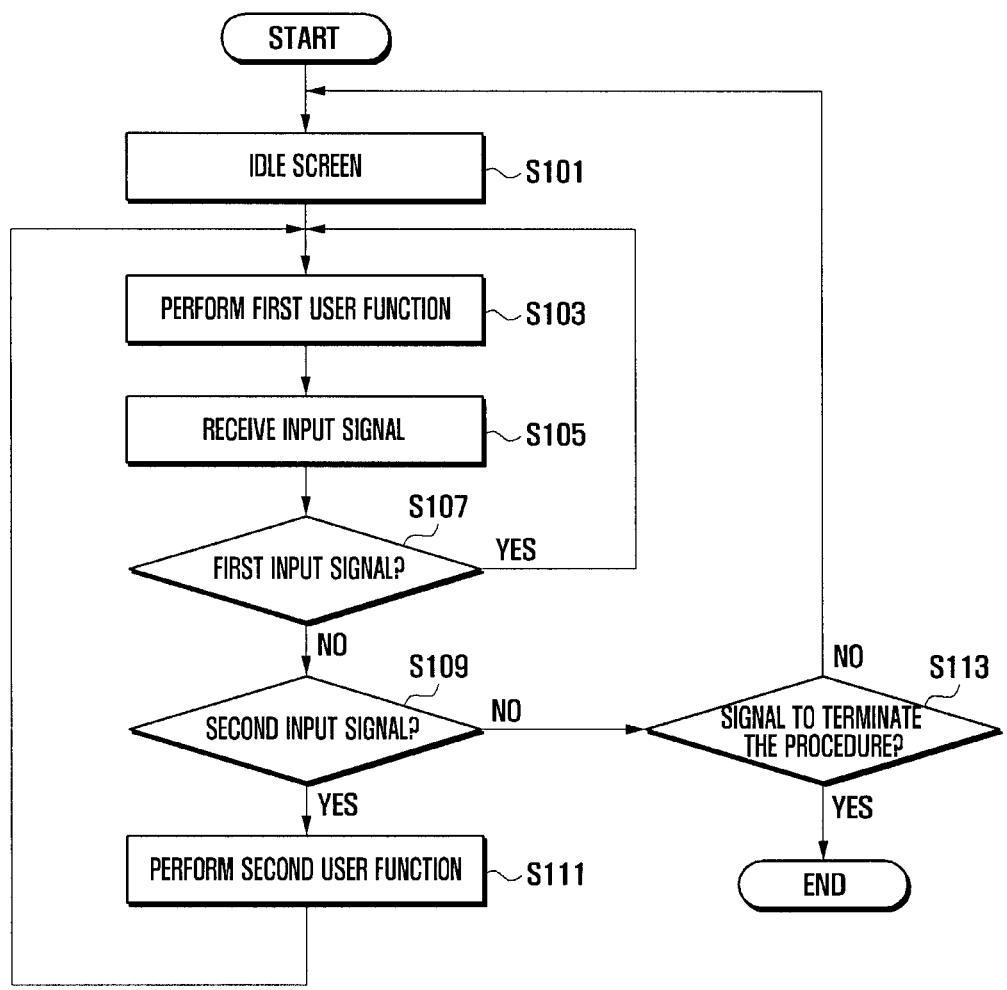
FIG. 6 is a flow chart that describes a method for activating user functions by types of input signals, according to an embodiment of the present invention.

FIG. 6 is a flow chart that describes an exemplary method for activating user functions by types of input signals, according to an embodiment of the present invention.

Referring to FIG. 6, when the portable terminal is turned on, its elements are initialized. After that, the portable terminal displays a preset idle screen on the display unit (S101). The portable terminal may also be set to display the idle screen on the display unit when the portable terminal is activated from a sleep state. The portable terminal is operated in the sleep mode if it does not operate to provide corresponding services for a preset period of time. The portable terminal may also be set, according to a user's setting, to activate the touch panel when the display unit is activated, so that the touch panel can detect a user's touch.

When a user's input signal is generated, the portable terminal performs a first user function corresponding to the user's input signal (S103). For example, if the user generates a touch event for activating one of the functions, such as a message writing function, a file playback function, a file search function, etc., the portable terminal activates a first user function according to the touch event. After that, the portable terminal receives the user's input signal (S105). The portable terminal determines whether the user's input signal corresponds to a first input signal for controlling the first user function (S107). If the portable terminal ascertains that the user's input signal corresponds to the first input signal at S107, it returns to step S103 and controls the first user function that is currently being activated. For example, if the first user function corresponds to a message writing function, the portable terminal activates and displays a message writing window on the display unit at S103. If the user's input signal is the first input signal, i.e., a touch event for allowing a user to write a message, the portable terminal may display numbers, alphabets, emoticons, or the like, etc. on the message writing window, according to corresponding touch events.

On the contrary, if the portable terminal ascertains that the user's input signal does not correspond to the first input signal at S107, it determines whether the user's input signal corresponds to a second input signal whose type differs from that of the first input signal (S109). If the portable terminal ascertains that the user's input signal corresponds to a second input signal at S109, it performs a second user function based on the second input signal (S111). After that, the portable terminal maintains the activation of the first user function at S103 and the second user function at S111, and then performs corresponding user functions according to user's input signals, respectively.

However, if the portable terminal ascertains that the user's input signal does not correspond to a second input signal at S109, it determines whether the user's input signal corresponds to an input signal to terminate the use of the portable terminal (S113). If the portable terminal ascertains that the user's input signal corresponds to an input signal to terminate the use of the portable terminal at S113, it terminates the use of the portable terminal.

However, if the portable terminal ascertains that the user's input signal does not correspond to an input signal to terminate a user function at S113, it returns to step S101.

Although the method for activating user functions according to an embodiment of the present invention has been explained based on two user functions and types of input signals, it should be understood, however, that the present invention is not limited solely to the embodiment described herein. That is, the user can activate a plurality of user functions provided by the portable terminal. To this end, the user can generate input signals to activate and control the user functions, respectively, during the activation. For example, the user can generate at least one of a touch event generated on the touch screen, a key input signal generated from the key input unit, data generated via voice recognition, and a motion signal generated according to a motion state of the portable terminal. The portable terminal can activate corresponding user functions preset according to the generated input signals. During this process, the portable terminal can activate a particular user function according to a particular input signal, irrespective of whether a user function is being activated in the portable terminal. According to a user's settings or a portable terminal manufacturer's design, the portable terminal can control a screen displaying, a voice signal outputting, a vibration outputting, etc., which corresponds to a user function that is activated according to a currently received input signal, by associating a screen displaying, a voice signal outputting, a vibration outputting, etc., which correspond to a previously activated user function. For example, screens corresponding to first and second user functions can be displayed on separated screens and separated areas, respectively, according to a corresponding user function, and icons corresponding to a performed user function, etc., can also be displayed thereon. The portable terminal can also apply a voice signal output function and a vibration outputting function thereto according to the activation of a plurality of user functions.

It should be understood that the present invention is not limited to the screen displaying method or a method for displaying other information. It will be appreciated that the present invention can independently activate a plurality of user functions according to input signals that are generated by a variety of methods that differ from each other. It will also be appreciated that the screen displaying method or the method for displaying other information can be variously implemented according to a plurality of user functions, a user's settings, a portable terminal manufacturer's purposes, etc.

The above-described methods according to the present invention can be realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein. In addition, the computer, processor or dedicated hardware may be composed of at least one of a single processor, a multi-processor, and a multi-core processor.

As describe above, the method and the portable terminal adapted thereto, according to the present invention, can activate a plurality of user functions according to various types of input signals and allow a user to rapidly and easily control them.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A method for activating applications, comprising:
   displaying a screen of an executing first application;
   while the screen of the executing first application is displayed, outputting an event notification for an executing second application different from the executing first application;
   receiving an input signal after outputting the event notification;
   performing, when the input signal is received only from a first input unit, a function of the executing first application; and
   when the input signal is received only from a second input unit different from the first input unit, performing a function of the executing second application and displaying the screen of the executing first application and a screen of the executing second application simultaneously.

2. The method of claim 1, wherein:
   the input signal received from the first input unit comprises at least one of a touch or a key input signal, and the input signal received from the second input unit comprises at least one of a voice command or a motion signal.

3. The method of claim 1, further comprising:
   displaying at least one of: an icon, a voice signal, and a vibration, in response to the activation of the executing second application.

4. The method of claim 3, wherein the executing second application detects whether a message has been received, and displaying at least one of the executing second application, the icon, the voice signal, and the vibration further comprises:
   converting visual information contained in the received message into the voice signal, and
   playing the voice signal through a speaker.

5. The method of claim 1, wherein the executing first and second applications are executed simultaneously without executing a switch to one application from among a plurality of active applications.

6. A portable terminal, comprising:
   input units;
   a display unit; and
   a controller, including a processor, configured to:
   display via the display unit a screen of an executing first application,
   while the screen of the executing first application is displayed, output an event notification for an executing second application different from the executing first application,
   receive an input signal after outputting the event notification,
   perform, when the input signal is received only from a first input unit, a function of the executing first application, and
   when the input signal is received only from a second input unit different from the first input unit, perform a function of the executing second application and display via the display unit the screen of the executing first application and a screen of the executing second application simultaneously.

7. The portable terminal of claim 6, wherein
The input signal received from the first input unit comprises a touch or a key input signal.

8. The portable terminal of claim 7, wherein the controller is further configured to:
display on the display unit at least one of: an icon, a voice signal, and a vibration in response to the receiving of the input signal.

9. The portable terminal of claim 6, wherein the input signal received from the first input unit comprises a touch, and the input signal received from the second input unit comprises motion information.

10. The portable terminal of claim 6, wherein the controller is further configured to:
convert information contained in a received message into a voice signal, and output the voice signal through a speaker.

11. A portable terminal comprising:
input units;
a display unit; and
a processor in communication with a memory, the memory including code, which when executed by the processor causes the processor to:
display via the display unit a screen of an executing first application,
while the screen of the executing first application is displayed, output an event notification for an executing second application different from the executing first application,
receive an input signal after outputting the event notification,
perform, when the input signal is received from a first input unit, a function of the executing first application, and
when the input signal is received only from a second input unit different from the first input unit, perform a function of the executing second application and display via the display unit the screen of the executing first application and a screen of the executing second application simultaneously.

12. The portable terminal of claim 11, wherein the code is further executable to cause the processor to:
reduce a display area of the screen of the executing first application to generate a new display area for the executing second application so that the screen of the executing first application and the screen of the executing second application are displayed simultaneously, the reducing the display area of the executing first application further comprising at least one of: changing a resolution and removing a displayed portion of the executing first application.

13. The method of claim 1, wherein:
the executing first application is a media player, and the executing second application is a messaging application, and
displaying the screen of the executing first application and the screen of the executing second application simultaneously further includes displaying a graphical user interface in a screen of the media player, and displaying a message in a screen of the messaging application, and
the method further comprises playing back a media file of the media player.

14. The method of claim 13, wherein:
the input signal received from the first input unit is touch, and the input signal received from the second input unit is voice command.

15. The method of claim 1, wherein:
the executing first application is a photo album, and the executing second application is a messaging application, and
displaying the screen of the executing first application and the screen of the executing second application simultaneously includes displaying a graphical user interface, including displayed searchable images, in a screen of the photo album, and displaying a notification in a screen of the messaging application when a message is received, and
the method further comprises outputting an audio signal corresponding to the message.

16. The method of claim 15, wherein:
the input signal received from the first input unit is touch, and the input signal received from the second input unit is voice command.

17. The method of claim 1, wherein:
the executing first application is a messaging application, and the executing second application is a media player, and
displaying the screen of the executing first application and the screen of the executing second application simultaneously includes displaying a graphical user interface, including a keypad for entering text and a display field for displaying inputted text, in a screen of the messaging application, and displaying a notification, indicating a media file being played, in a screen of the media player.

18. The method of claim 17, wherein:
the input signal received from the first input unit is touch, and the input signal received from the second input unit is voice command.

19. The method of claim 1, wherein the executing second application is activated while the screen of the executing first application is displayed in response to receiving only the input signal from the second input unit.

20. The method of claim 1, further comprising:
reducing a display area of the screen of the executing first application to generate a new display area for the executing second application so that the screen of the executing first application and the screen of the executing second application are displayed simultaneously.

* * * * *